United States Patent Office 3,454,467
Patented July 8, 1969

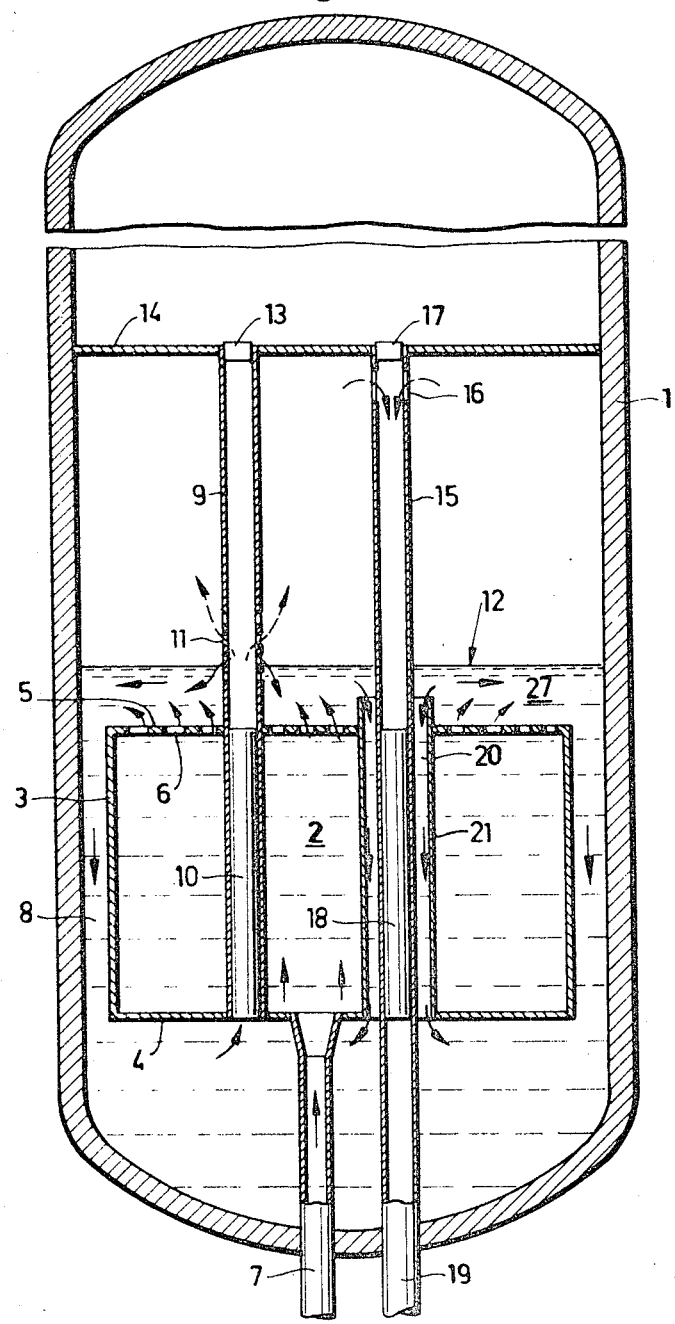

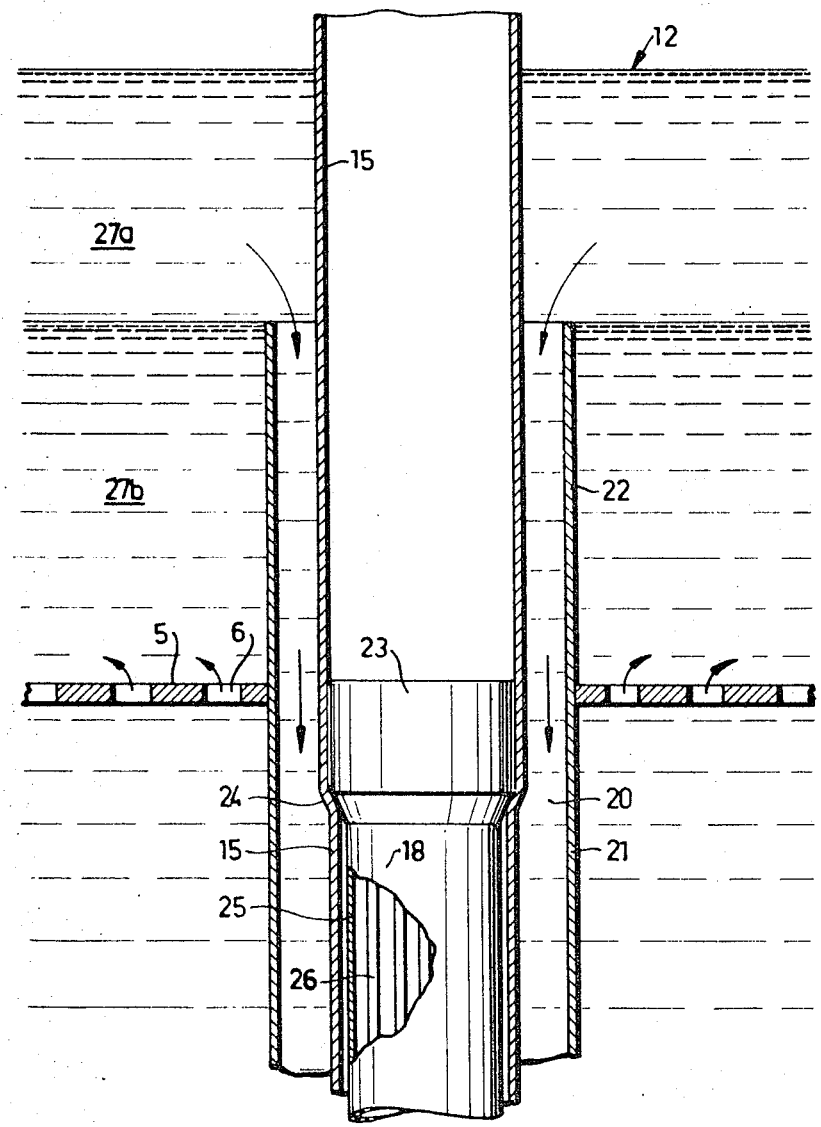

3,454,467
INTEGRAL BOILING WATER-SUPERHEAT NUCLEAR REACTOR
Lars Olof Tor Wadmark, Malmo, Sweden, assignor to Aktiebolaget Atomenergi, Stockholm, Sweden
Filed Mar. 18, 1966, Ser. No. 535,406
Claims priority, application Sweden, Apr. 1, 1965, 4,231/65
Int. Cl. G21c *15/22*
U.S. Cl. 176—54                    2 Claims

ABSTRACT OF THE DISCLOSURE

Condensation of steam on the interior walls of a superheater tube of a boiling water-superheat nuclear reactor is minimized by extending the superheater tube through the moderator vessel of the reactor whilst being enclosed within an auxiliary tube (a) the upper end of which is open and communicates with the water space above the moderator vessel and (b) the lower end of which communicates with the water space below the moderator vessel.

---

The invention relates to a nuclear reactor of the type comprising a pressure vessel, a water space in the lower portion of said pressure vessel, a steam space above said water space, a moderator tank in said water space, means for feeding water to said moderator tank, openings in said moderator tank to allow water to pass from the moderator tank into the water space, a plurality of boiler tubes containing fissile fuel and extending vertically through the moderator tank to receive water from the space below the moderator tank and to heat said water to produce steam and to supply said steam to the steam space, and at least one superheater tube containing fissile fuel and extending vertically through the moderator tank to receive steam from the steam space and to superheat said steam and to supply the superheated steam to a steam outlet.

In known nuclear reactors of this type the superheater tubes have been directly surrounded by the comparatively cold moderator water. This involves a risk of an undesired condensation of steam on the interior wall of the superheater tubes. The invention is primarily concerned with providing means to eliminate or reduce the risk of such condensation. It is another object of the invention to provide means making it possible to exchange the fuel elements in the superheater tubes while the reactor is being operated. Other objects of the invention will be apparent from the following specification.

According to the invention said risk for condensation is eliminated or reduced by the improvement that the superheater tube extends through the moderator tank inside an auxiliary tube having an open upper end communicating with the water space above the moderator tank and an open lower end communicating with the water space below the moderator tank. Said auxiliary tubes will contain water having a temperature higher than that of the moderator water. Consequently, the superheater tubes will be surrounded by comparatively hot water, resulting in a reduced risk for condensation. The higher the water temperature, the lower the risk for condensation. Therefore, it is preferred to supply to said auxiliary tubes hot water coming from the boiler tubes. This is illustrated on the accompanying drawings which disclose an embodiment of the reactor of the invention. FIG. 1 illustrates a vertical cross-section of the reactor. FIG. 2 illustrates, on a larger scale, a portion of the reactor of FIG. 1.

The illustrated reactor consists of a cylindrical pressure vessel 1 containing a core 2 for fissile fuel. The core is enclosed in a moderator tank consisting of a cylindrical wall 3, a bottom 4 and a top plate 5 having openings 6. Water is supplied to the bottom of the moderator tank through a tube 7. Said water originates from the condensor of a steam turbine. On its way from the condensor it has passed through one or several preheaters, and enters into the moderator tank at a temperature of 120° C., for instance. The water flows upward through the moderator tank while acting as moderator, and leaves the moderator tank through the openings 6 at a temperature of 220° C., for instance.

The reactor contains a plurality of boiler tubes 9, preferably made of zirconium. For the sake of simplicity only one boiler tube is illustrated in FIG. 1. The lower portion of the tube, extending through the core, contains a fuel element 10. Water flows upward through said fuel element while boiling. The mixture of steam and water leaves the boiler tube through openings 11 situated on a level higher than the normal water level 12 in the reactor. The top of the boiler tube is fastened to a partition 14, and is closed by a plug 13.

The reactor also contains a plurality of superheater tubes 15, preferably made of zirconium, only one being illustrated. The portion of the superheater tube extending through the core contains a fuel element 18. Steam flows downward through said superheater element while being superheated. The superheated steam leaves the reactor through a conduit 19. Saturated steam enters into the superheater tube through openings 16 in its upper portion. The top of the superheater tube is fastened to the partition 14 and is closed by a plug 17. The top of the fuel element 18 has a head 23 supported on a restricted portion 24 of the superheater tube, see FIG. 2. The fuel element 18 consists of a cylindrical casing 25 containing a plurality of fuel rods 26. The casing 25 acts as an insulating tube, preventing the heat from the fuel rods 26 from reaching the superheater tube 15. The casing 25 preferably consists of stainless steel.

The superheater tube 15 is situated in a channel 20 defined by an auxiliary tube 21 extending through the core. The upper end 22 of this auxiliary tube extends somewhat above the top 5 of the core, but not as far as the normal water level 12 of the reactor.

The top water layer 27, between the top 5 of the moderator tank and the water level 12 receives water from two directions, namely comparatively cold moderator water 27b from below and hot water 27a from above, said hot water originating from the boiler tubes. The hot water 27a has a tendency of stratifying upon the colder water 27b see FIG. 2, and therefore the hot water 27a will be sucked down into the annular space 20 surrounding the superheater tube. The upper portion 22 of the auxiliary tube 21 will prevent the colder water 27b from entering into said annular space 20. Consequently, the superheater tube 15 will be surrounded by hot water, nearly boiling, preventing steam from condensing on its interior wall.

The remaining quantity of comparatively cold water from the water layer 27 flows down in the space 8 between the moderator tank and the pressure vessel, and is subsequently sucked into the bottom opening of the boiler tubes 9. The boiling in said tubes produces a self-circulation which is normally sufficient for sucking the hot water 27a down into the space 20.

The superheater elements 18 may be exchanged under operation by means of a known apparatus which is not illustrated. When during such an exchange a superheater tube does not contain a fuel element, saturated steam will flow through said superheater tube. Because of the tube being surounded by hot water said saturated steam will not condense on the tube wall, or will condense in an insignificant amount only. When a used superheater element is being lifted up, or when a new element is being inserted, the water in the space 20 may boil. The boiling changes the illustrated flow direction in the space 20, but said change is not harmful to the operation of the reactor. The boiling ceases as soon as the new superheater element has reached its position. If a superheater element is used which has no insulating casing 25, this may also result in boiling of the water in the space 20. Such boiling can be allowed, as stated above, and the invention comprises the use of such a superheater element.

The entire quantity of water of the water layers 27a and 27b may be allowed to flow down through the spaces 20. The addition of the comparatively cold water 27b will result in a water temperature in the space 20 which is a few degrees below the boiling point. Consequently, the safety against condensation is not as high as in the illustrated case.

In the illustrated reactor the tube 15 contains one superheater element 18 only. It is within the scope of the invention to provide a tube 15 having a comparatively large diameter and containing a plurality of narrow superheater elements, each such element consisting of a cluster of fuel rods enclosed within an insulating tube.

A nuclear reactor usually also contains a tube through which used fuel elements are removed from the reactor and new fuel elements are inserted. Also this tube suffers from the risk that steam may condense on its interior wall. Therefore, it is preferred to surround said tube, extending through the reactor core, with comparatively hot water by using the inventive idea described in this specification.

I claim:

1. A boiling water nuclear reactor, comprising a pressure vessel, a water space in the lower portion of said pressure vessel, a steam space above said water space, a moderator tank in said water space, means for feeding water to said moderator tank, openings in said moderator tank to allow water to pass from the moderator tank into the water space, a plurality of boiler tubes containing fissile fuel and extending vertically through the moderator tank to receive water from the space below the moderator tank and to heat said water to produce steam and to supply said steam to the steam space, and at least one superheater tube containing fissile fuel and extending vertically through the moderator tank to receive steam from the steam space and to superheat said steam and to supply the superheated steam to a steam outlet, in which reactor the superheater tube extends through the moderator tank inside an auxiliary tube, said auxiliary tube having an open upper end communicating with the water space above the moderator tank and an open lower end communicating with the water space below the moderator tank.

2. A nuclear reactor as claimed in claim 1, in which the upper end of the auxiliary tube extends to a level above the moderator tank but below the water level.

References Cited

UNITED STATES PATENTS

| | | | |
|---|---|---|---|
| 3,132,999 | 5/1964 | Linsenmeyer | 176—54 |
| 3,188,277 | 6/1965 | Kornbichler et al. | 176—54 X |
| 3,211,625 | 10/1965 | Setterwall | 176—54 |
| 3,284,310 | 11/1966 | Straat | 176—54 |

BENJAMIN R. PADGETT, *Primary Examiner.*

M. J. SCOLNICK, *Assistant Examiner.*